Patented Nov. 26, 1940

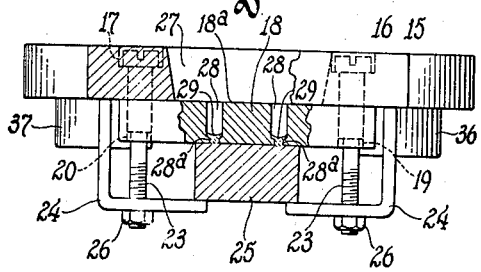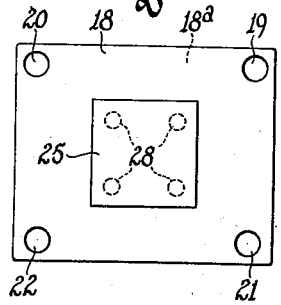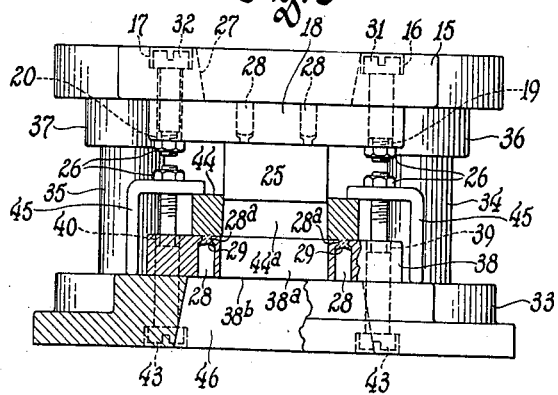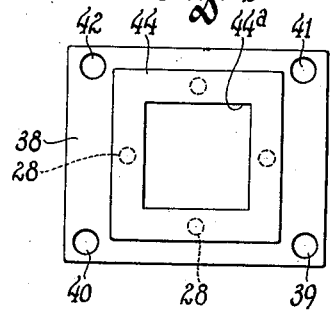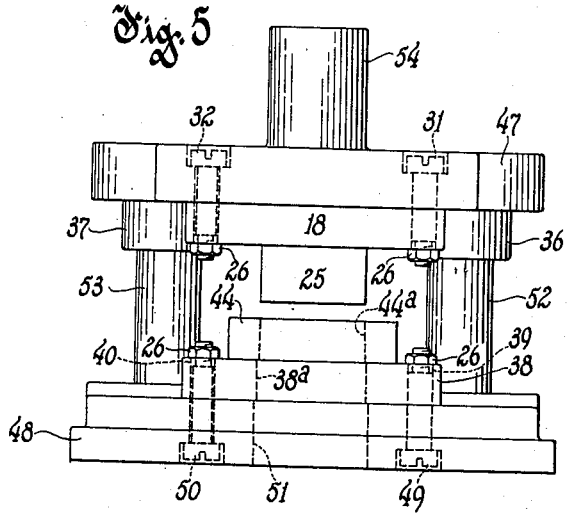

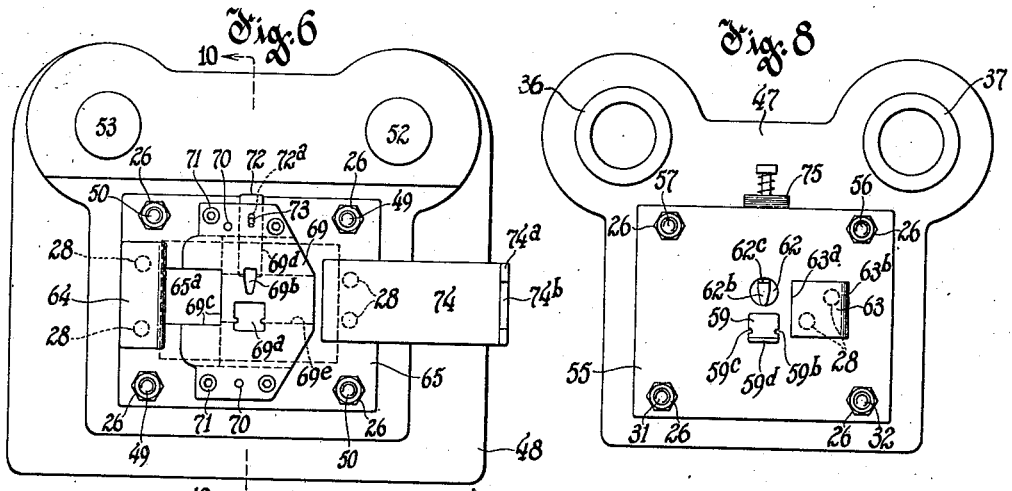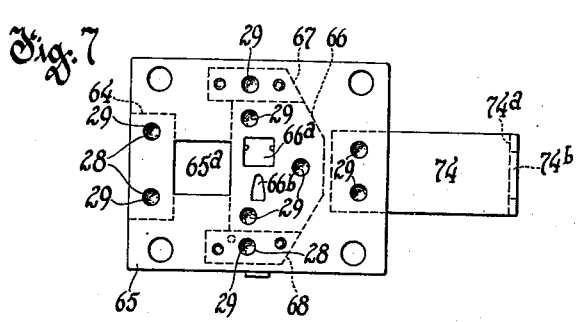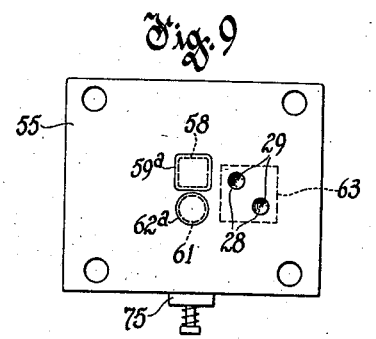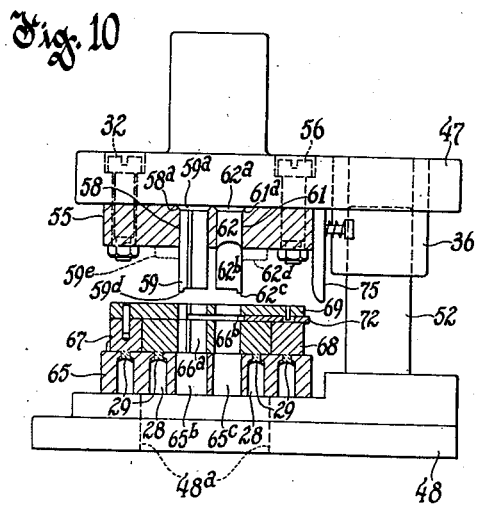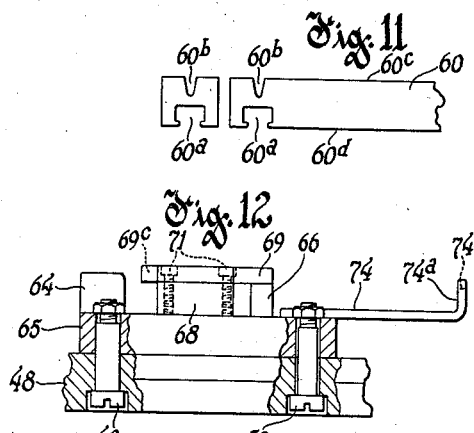

2,222,860

UNITED STATES PATENT OFFICE 2,222,860

METHOD OF MAKING DIE SETS

Harry A. Sedgwick, Shorewood, and Arthur Johnson, Wauwatosa, Wis.

Application November 12, 1937, Serial No. 174,214

5 Claims. (Cl. 76—107)

This invention relates to improvements in die sets and dies therefor, and methods of making the same.

The invention has among its objects to provide a die set of simplified form in respect of its die parts and in respect of attachment of said die parts to their respective bolsters or shoes.

Another object is to provide a die set wherein different pairs of die parts may be used interchangeably and wherein one pair of die parts may be substituted for another pair conveniently and expeditiously.

Another object is to provide for forming of the die parts in a convenient and expeditious manner with a substantial reduction in the required amount of tool steel and labor.

Another object is to obviate the need of dowel pins and screws heretofore required.

Another object is to provide for welding of a die onto a relatively soft steel base or backing plate in a manner such that the cutting edge or edges of the die are unimpaired by the welding, and such that die parts of relatively small cross section may be so secured to such bases or backing plates.

Another object is to provide for welding of dies to backing plates in a manner such that after one has been welded to its backing plate welding of its complementary die to its backing plate may be conveniently accomplished after interfitting the dies and alining their backing plates and while the dies and their backing plates are maintained in such relation.

Another and more specific object is to provide a die set wherein the relatively soft steel backing plates only are provided with openings to provide for rivet welding of the respective die parts thereto.

Another object is to provide a die set wherein the welded connections between the backing plates and the respective die parts may be readily removed by simple drilling operations, without injury to or mutilation of said die parts.

Other objects and advantages of the invention will hereinafter appear.

The accompanying drawings illustrate certain embodiments of the invention which will now be described, it being understood that the embodiments illustrated are susceptible of modification in respect of certain structural details thereof without departing from the spirit and scope of the invention as defined by the appended claims.

In the drawings, Figure 1 is a view, partly in side elevation and partly in vertical section, of a portion of a die set, illustrating the manner in which the tool steel punch member and the relatively soft steel supporting flange forming plate therefor may be temporarily held in assembled relationship to each other and to an upper jig member having an opening to facilitate rivet welding of said punch member to said plate.

Fig. 2 is a plan view of the punch member and the supporting flange forming plate to which the same is attached by the rivet welded connections at the points indicated in dotted lines.

Fig. 3 is a view quite similar to Fig. 1, but showing the manner of temporarily holding the tool steel die member and the relatively soft steel supporting flange forming plate therefor in assembled relationship to each other and to a lower jig member, while said punch and die members are arranged in cooperative interengagement and the upper and lower jig members are maintained in alinement with each other by well known means,—said lower jig member having an opening to facilitate rivet welding of said die member to said plate.

Fig. 4 is a plan view of the die member and the supporting flange forming plate to which the same is attached by the rivet welded connections at the points indicated in dotted lines.

Fig. 5 is a side elevational view of a standardized die set comprising upper and lower die shoes to which my improved punch and die members may be readily attached, as by means of the respective flange forming plates associated with the latter.

Fig. 6 is a plan view of the lower die shoe of a slightly modified form of die set to which is releasably attached a relatively soft steel flange forming plate having rivet welded thereto the tool steel die and stop members, the supports for the stripper plate, and a suitable bracket or guide for the material being fed to the punch press.

Fig. 7 is a bottom plan view of the flange forming plate shown in Fig. 6, the various elements attached to the upper surface of said plate being shown in dotted lines, and the points at which said elements are attached to said plate by rivet welding are also illustrated.

Fig. 8 is a plan view of the upper die shoe of a die set to which is releasably attached a relatively soft steel flange forming plate to which is rivet welded one of the tool steel punch members, two other tool steel punch members being attached to said plate by wedging or driving the former into suitable openings provided in the latter and then upsetting or riveting the rear ends of said punch members.

Fig. 9 is a plan view of the rear surface of the last mentioned plate, showing the rivet welded connections between the latter and one of said punch members and the manner of upsetting or riveting the rear ends of the other punch members.

Fig. 10 is a view, partly in side elevation and partly in vertical section on the line 10—10 of Fig. 6, but showing both the lower and upper die shoes and the various elements of the die set assembled with respect thereto.

Fig. 11 is a plan view of a fibrous insulating strip to be operated upon by the punch and die elements, an insulating element being shown at the left-hand end of this figure after the punching and cutting off operations, and the adjacent end portion of the strip showing the form assumed thereby after the punching operation but prior to the cutting off operation, and Fig. 12 is a fragmentary view of the bottom die bolster and its associated parts, portions of the die bolster and plate being shown in section to illustrate the dowel-pin or locating effect of certain of the securing bolts.

A metal working or similar die as heretofore constructed usually consisted of a standardized die set, comprising a tool steel piece constituting the die proper, another tool steel piece constituting the punch, and a stripper plate which is usually formed of cold rolled bar steel. Such a die set included a lower or die bolster into which were forced two or more hardened or ground steel pins of such size and strength that they might be used as guide pins with which to properly aline the upper or punch bolster. The punch bolster was generally provided with ground and/or hardened openings or bushings which fit the guide pins of the die bolster very nicely to properly maintain alinement of said bolsters.

The tool steel die member itself was of a size sufficiently greater than that required for the actual die form to provide stock for preventing breakage and to furnish an area or areas in which were placed various dowel pins and holding screws or bolts to fasten the die to the die bolster. In like manner the punch was generally made with a base section considerably larger than the operative portion thereof to provide the necessary area for dowels and holding screws. The stripper plate was normally attached to the tool steel die and was doweled and screwed to it in such a manner that it might be removed to permit grinding or refinishing of the cutting edge or edges of the die when dulled.

In accordance with our invention, however, the tool steel die and the tool steel punch are each separately welded (preferably by so-called rivet welds) to cold rolled or other relatively soft steel backing plates in such a manner that no dowels or screws are required, thereby eliminating the time required to lay out, drill, ream, tap and otherwise prepare the different pieces for assembly. The stripper plate in a die set constructed in accordance with our invention may be attached to suitable blocks or bosses of relatively soft steel welded to the backing plate to which the die member is attached. Inasmuch as the stripper plate must be removable to permit grinding of the die member, such stripper plate is provided with dowels and screws to retain the same in position, but the dowel and screw holes are provided in softer and more readily workable material. In accordance with our invention the screws and dowels employed for attaching the stripper plate to the soft steel blocks are the only ones required to be used throughout the entire die set.

By providing properly reamed mounting holes in the aforementioned backing plates and by furnishing the punch press department of a factory with a relatively small number of the standardized die sets, provided with dowel bolts corresponding in position to the reamed holes in the backing plates, the necessity for providing a die set with each die is eliminated, the required amount of storage space for the die members is reduced, and time is saved in the punch press department for the required set-up. Our invention provides for use of very much smaller pieces of tool steel for the punch and die members than are ordinarily required; and by obviating the necessity for drilling or otherwise machining the tool steel parts to effect attachment thereof to the other die parts, the cost of the die parts and the time and labor required for assembling the same are greatly reduced.

Referring first to the embodiment of our invention illustrated in Figs. 1 to 5, inclusive, the numeral 15 designates a metal plate or block, for temporary use, which corresponds in contour with the upper bolster of a die set. Plate 15 is preferably provided with four openings, two of which are shown at 16 and 17 (Figs. 1 and 3). A cold rolled or other relatively soft steel backing plate 18 is provided with a pair of openings 19 and 20 which are alined with openings 16 and 17, the other pair of openings 21 and 22 in plate 18 (Fig. 2) being alined with the other pair of openings (not shown) in plate 15.

As will be noted from Fig. 2, openings 19 and 20 are spaced apart a greater distance than the openings 21 and 22, whereby upon positioning of the surface 18ᵃ against the lower surface of plate 15, the various openings in said plates will register with each other only in one relative position of said plates. A plurality of temporary fastening screws or bolts 23 are inserted with a dowel fit through certain of the alined openings in plates 15 and 18, and the threaded lower ends of said screws penetrate openings provided in the horizontal arms of a corresponding number of substantially L-shaped clamping members 24, the vertical arms of members 24 preferably bearing against plate 15. A tool steel member 25 is located in the desired position against the lower surface of plate 18, whereupon the nuts 26 are tightened to temporarily clamp plates 15 and 18 and member 25 in assembled relation.

Plate 15 is provided with a relatively large opening 27 which is adapted to provide access to a plurality of openings 28 provided in plate 18, as indicated in dotted lines in Fig. 2. Plate 18 is here shown as provided with four of such openings 28, although the number thereof employed may be increased or decreased if desired. In practice, however, we prefer to employ at least two of such openings 28. Openings 28 are preferably formed in plate 18 by drilling thereof prior to the aforementioned temporary assembly of the parts; and as best illustrated in Fig. 1 said openings 28 have portions 28ᵃ of reduced diameter which open to the rear surface of member 25.

With the parts temporarily held in assembled relation as shown in Fig. 1, member 25 is rigidly united with plate 18 by welding operations at each of the openings 28, the welding metal as shown integrally uniting with the metal at the rear portion of member 25, and said welding metal filling the reduced portion of each opening 28 and extending upwardly and laterally with respect thereto, as shown at 29, to provide the so-called rivet welded connections between these parts. In practice, after each rivet welding operation at one of the openings 28 the member 25 and plate 18 are allowed to cool to a substantial degree before proceeding with the next rivet weld. This procedure not only insures against excessive heating of member 25, but it also insures against setting up of undue stresses or strains which might ensue from simultaneous welding at a plurality of points with consequent simultaneous cooling at said points.

After attachment of member 25 to plate 18 by welding, as aforedescribed, the nuts 26 are withdrawn to permit removal of clamp members 24 and bolts 23, two bolts like that shown at 31 and two bolts like that shown at 32 being substituted for bolts 23, the pairs of bolts 31 and 32 cooperating with the aforementioned nuts 26 to retain plate 18, with its attached member 25, in temporary assembled relation to plate 15. In practice each of the two bolts 31 are so formed as to act as dowel pins for cooperation with the diagonally disposed openings 19 and 22 in plate 18, whereas the pair of bolts like 32 fit rather freely within the diagonally disposed openings 20 and 21 in plate 18. The bolts 31 thus act to insure proper positioning of plate 18 relatively to plate 15.

In Fig. 3 we have shown a metal plate or block 33 which preferably corresponds in contour with the lower bolster of a die set. Plate 33 has relatively large pins 34 and 35 attached thereto with a drive fit, said pins cooperating with openings extending through plate 15 and through suitable bosses 36 and 37 formed on the latter to insure proper alinement of plates 15 and 33 relatively to each other. Superimposed upon plate 33 is a relatively soft steel backing plate 38 having pairs of openings 39, 40 and 41, 42 formed therein (see Fig. 4) to receive with a close or dowel fit a corresponding number of relatively long temporary securing bolts 43 which extend upwardly through plate 33.

Superimposed upon plate 38 is a tool steel die member 44 which in this instance is provided with an opening 44ᵃ which is machined or otherwise formed to properly receive the aforementioned punch member 25. Plate 38 (Fig. 3) is provided with an opening 38ᵃ which is preferably slightly larger than but alined with opening 44ᵃ to provide downward clearance for an article punched out by cooperative engagement of members 25 and 44. Prior to rigid attachment of member 44 to plate 38, the parts are temporarily held in partially assembled relation as by means of four clamping members (two of which are shown at 45), the vertical portions of members 45 preferably engaging plate 33 and the horizontal portions thereof overlapping the upper surface of die member 44. Nuts 26 cooperate with the threaded shanks of bolts 43 to effect tightening of clamp members 45 against die member 44.

Prior to tightening of clamp members 45 by nuts 26, the plate 15 with its attached parts is lowered to provide for registry and interengagement of punch member 25 with die member 44, as shown in Fig. 3. When die member 44 is properly positioned or centered with respect to punch member 25, clamps 45 are tightened by operation of nuts 26. Plate 33 is provided with a relatively large opening 46 to provide access to the lower surface 38ᵇ of plate 38, and the latter is provided with a plurality of openings 28 having portions 28ᵃ of reduced size which open to and register with portions of the lower surface of die member 44. In practice the entire assembly of parts as shown in Fig. 3 is inverted, or turned upside down, whereupon rivet welds 29 like those aforedescribed are effected in sequence to rigidly attach die member 44 to backing plate 38.

With punch and die members 25 and 44 thus rigidly attached to the respective backing plates 18 and 38, said plates may then be removed from the plates or temporary bolsters 15 and 33 of Fig. 3 and stored until required for use. When required for use the plate 18 with its attached punch member 25 may be readily assembled with respect to the upper die bolster 47 (Fig. 5) as by means of pairs of bolts 31 and 32, like those described in connection with Fig. 3, and nuts 26. In like manner the backing plate 38 with its attached die member 44 may be readily assembled with respect to the lower die bolster 48 as by means of a pair of bolts like that shown in dotted lines at 49 in Fig. 5, said pair cooperating with the diagonally arranged pair of openings 39 and 42 (Fig. 4) in plate 38 and acting as dowel pins to insure proper positioning of plate 38 relatively to bolster 48; a second pair of bolts like that shown in dotted lines at 50 in Fig. 5 having a fairly loose fit within the diagonally arranged pair of openings 40 and 41 (Fig. 4) in plate 38; and all of said bolts having cooperating nuts 26.

As best illustrated in Fig. 4, the pair of openings 39 and 40 in plate 38 are relatively more widely spaced from each other than are the openings 41 and 42 of the other pair, whereby proper positioning of plate 38 with respect to bolster 48 is insured. Although we provide differently spaced pairs of openings in plates 18 and 38 to insure attachment thereof respectively in only one relationship to their associated bolsters 47 and 48, it is to be understood that other expedients might be resorted to for accomplishment of this result. For instance, one of the openings, such as 19 of plate 18 and 41 of plate 38, might be made of a different size from other openings in the plate, either with or without a like degree of spacing of the respective pairs of openings; a correspondingly large securing bolt being provided for cooperation with said one opening in each plate.

As shown in dotted lines in Fig. 5, the lower bolster 48 is preferably provided with an opening 51 alined with the opening 38ᵃ in plate 38 and the opening 44ᵃ in die member 44 to provide clearance for the punched articles. Bolster 48 as shown is provided with guide pins 52 and 53 having a drive fit within suitable openings (not shown) formed therein, said guide pins 52, 53 cooperating in a well known manner with suitable openings provided in bolster 47 to insure alinement of the latter with bolster 48. Bolster 47 is provided with a stud or projection 54 for attachment to the plunger or movable element of a punch press in a well known manner.

With particular reference to the illustration in Fig. 1, it should be noted that after rivet welding of punch member 25 to plate 18 these parts may be separated when desired by simply drilling out the full area of the openings 28 to a plane flush with the adjacent (or rear) surface of punch member 25, whereby the rivet welded connections between the parts are eliminated. The punch member 25 may then (in the same or in a modified form) be attached by rivet welding operations to the same plate 18 or to another similar plate. If the plate 18 is again used in connection with punch member 25, the former will, of course, be provided with a new (or differently located) group of openings having portions of reduced diameter to provide the aforedescribed rivet welds. Die member 44 may, of course, be removed from its backing plate 38 in a similar manner.

The advantages of our invention as hereinabove described will be at once apparent to those skilled in the art. Thus we provide rigid and immovable connections between the punch and die members and their respective backing plates. The welded connections between the respective members and their backing and supporting plates are effected at points most remote from the operative surfaces or cutting edges of the punch and die members, thus avoiding any deleterious effects upon the operative portions of said members. The entire body portions of the punch and die members are left intact, and free from bolt holes or the like which would inherently weaken the same and reduce the life thereof. Moreover, the necessity in prior devices for bolt holes in the punch and die members required annealing of the hardened or tool steel members to permit formation of the holes by drilling, for instance, with the consequent necessity for thereafter treating such members to again harden the same to the required degree.

With further reference to the device of Figs. 1 to 5; if a stripper plate were employed, the same would be releasably attached, as by means of dowels and screws, to a pair of relatively soft steel blocks or plates arranged on opposite sides of die member 44 (Fig. 4) and rivet welded to plate 38 through the medium of a suitable number of additional openings like 28 provided in the latter. An arrangement involving use of such a stripper plate is illustrated in the device of Figs. 6 to 12, inclusive, which will now be described.

In the device of Figs. 6 to 12 certain of the elements may be identical with corresponding elements shown in Fig. 5, and the same have been given like numerals of reference. Thus in Figs. 6 to 12 we have shown an upper bolster 47 and a lower bolster 48 of a die set. Bolster 47 has attached thereto a relatively soft steel plate 55, as by means of four bolts, one pair of which are designated by the numerals 31 and 32 (Fig. 8) and the other pair are designated by numerals 56 and 57. Bolts 31, 32 are relatively more widely spaced than bolts 56, 57 to insure proper positioning of plate 55 relatively to bolster 47. It is to be understood that bolts 31 (Fig. 10) and 56 (Fig. 8) have a rather close or dowel fit within the corresponding openings in bolster 47 and plate 55, whereas the bolts 32 and 57 may have a rather loose fit within the corresponding openings in bolster 47 and plate 55.

Plate 55 is provided with an opening 58 of substantially rectangular cross section to receive with a drive fit a tool steel punch member 59 of corresponding form in cross section. A substantial portion of member 59 (Fig. 10) projects below the lower surface of plate 55, and the upper end of said member is riveted over or upset into an enlargement or recess 58ᵃ provided at the upper end of opening 58 as shown at 59ᵃ, whereby downward displacement of member 59 from plate 55 is prevented. Member 59 is provided in its opposite sides with grooves 59ᵇ, 59ᶜ of substantially semi-circular form in cross section, for cooperation with projections formed on opposite side walls of one of the die openings, as hereinafter described. Member 59 is provided at its lower end with a non-cutting portion 59ᵈ which assists in alining or positioning the strip of material 60 (Fig. 11) to be operated upon by the punch press.

Plate 55 is further provided with an opening 61 of substantially circular form in cross section which is adapted to receive with a drive fit the correspondingly shaped portion of a tool steel punch member 62 the upper end of which is riveted over or upset into an enlargement or recess 61ᵃ provided at the upper end of opening 61, as shown at 62ᵃ, whereby downward displacement of member 62 from plate 55 is prevented. The portion 62ᵇ of member 62 which projects downwardly from plate 55 is of the form best illustrated in Fig. 8, the lower end thereof having a non-cutting extension 62ᶜ which likewise assists in alining or positioning the strip 60 aforementioned.

We prefer to form and attach the members 59 and 62 in the manner illustrated in Figs. 8 to 10, inasmuch as the same may be machined from lengths of hard or tool steel cut from rods or bars of commercially available forms in cross section. It is to be understood, however, that member 59 might be provided with an integral lateral extension of the character shown in dotted lines at 59ᵉ in Fig. 10; and member 62 might be provided with an integral lateral extension of the character shown in dotted lines at 62ᵈ in said figure. Under these conditions those portions of members 59 and 62 which penetrate plate 55 could be omitted, and the members 59 and 62 could be attached to plate 55 by providing in the latter pairs of openings (like openings 28 in Figs. 1 to 4) alined with the body portion and lateral extension of each of said members, with subsequent rivet welding of said members to plate 55.

The tool steel member 63 (Figs. 8 and 9) is attached to plate 55 by the aforedescribed rivet welding operation, said plate as shown being provided with a pair of openings 28 which are preferably diagonally arranged to afford a maximum distance between such welds. Thus it will be understood that member 63 comprises a tool steel block whose flat rear surface is seated against the lower surface of plate 55, clamping members of the character illustrated at 24 in Fig. 2, as aforedescribed, being preferably employed to temporarily retain member 63 in assembled relation to plate 55 in the desired position with respect to each of the aforedescribed punch members 59 and 62 pending application of the rivet welds indicated at 29 in Fig. 9.

It should be pointed out that member 63 is required to have only one cutting edge, indicated at 63ᵃ in Fig. 8, the purpose of which is to cooperate with a portion of the female die member hereinafter described to cut off a length of the strip 60, which length has previously been operated upon by the punch members 59 and 62. For this reason the operative lower ends of members 59 and 62 are located in a common plane an appreciable distance below the lower surface of member 63. The opposite edge 63ᵇ (Fig. 8) of member 63 is preferably rounded slightly, as shown, to properly cooperate with a hard steel block 64, which latter acts as a stop for the strip 60 when the latter is fed forwardly after formation of the notches 60ᵃ and 60ᵇ therein by the aforedescribed punch members 59 and 62.

Block 64 is attached to the upper surface of a relatively soft steel backing plate 65 by rivet welds, as indicated at 28, 29 in Figs. 6 and 7. The female die member is preferably of the contour illustrated in dotted lines at 66 in Fig. 7, said die member being attached to the upper surface of plate 65 as by means of three rivet welds, as represented by the numerals 28, 29 in said figure. Die member 66 is provided with openings, designated in general by the numerals 66ª and 66ᵇ to accommodate with the usual sliding fit the exact contour of the operative portions of punch members 59 and 62, respectively. It is to be understood that prior to rivet welding of block 64 and die member 66 to plate 65 the same are definitely and accurately positioned with respect to said plate, and with respect to each other, by effecting cooperative interengagement of members 59, 62 and 63 therewith, while the latter and the plate 55 carrying the same are definitely positioned with respect to upper bolster 47 (or an element of similar shape), the latter being definitely positioned with respect to a temporary lower bolster (not shown) similar to that employed in the device of Figs. 1 to 5. Clamping members of the character illustrated at 45 in Fig. 3 are preferably employed to temporarily retain members 64 and 66 in assembled relation to plate 65 pending the aforementioned attachment of these parts by rivet welds, as indicated at 28, 29 in Figs. 7 and 10.

After attachment of die member 66 to plate 65 by the aforedescribed rivet welding operations, a pair of relatively soft steel blocks (shown in dotted lines at 67 and 68 in Fig. 7, and in section in Fig. 10) are each attached to plate 65 by a single rivet weld, as illustrated in Figs. 7 and 10. Thereupon the stripper plate 69 is attached, by dowel pins 70 and screws 71, to blocks 67 and 68, said stripper plate 69 having openings 69ª and 69ᵇ and a notch 69ᶜ alined with openings 66ª and 66ᵇ in die member 66 and with an opening 65ª provided in plate 65. Stripper plate 69 may therefore be removed to provide access to the upper surface of die member 66 for grinding or sharpening of the cutting edges of the latter.

Located within a guide groove 69ᵈ in the lower surface of stripper plate 69 is a slide plate 72 having a slot 72ª engageable with a pin 73 carried by plate 69 to limit movements of said slide plate. The inner end of plate 72 is adapted to engage one side edge of strip 60 during movement of the latter; and the aforementioned plate 55 (Fig. 10) has attached thereto a member 75 which is spring pressed inwardly to engage the outwardly projecting end of slide plate 72 as the punch members move toward the die member, thus biasing plate 72 against one edge 60ᶜ (Fig. 11) of strip 60 to insure engagement of the other edge 60ᵈ with the side wall 69ᵉ (Fig. 6) of a guiding slot or channel formed in the lower surface of stripper plate 69.

To further assist in guiding strip 60 we likewise attach to the upper surface of plate 65, as by means of rivet welds 28, 29 (Figs. 6, 7 and 12), a metal bracket 74, the upwardly bent end 74ª of which is provided with a notch 74ᵇ to accommodate strip 60. The final form of the insulating piece produced by the sequential punching operations is illustrated at the left-hand side of Fig. 11.

As best illustrated in Fig. 10, plate 65 is provided with openings 65ᵇ and 65ᶜ which provide clearance for the punched out portions which are forced downwardly through openings 66ª and 66ᵇ provided in die member 66, the aforementioned opening 65ª in plate 65 providing clearance for downward movement of the finished pieces 60ᵉ aforementioned. Lower bolster 48 (Fig. 10) is provided with a relatively large opening, shown in dotted lines at 48ª, to afford clearance for the parts falling downwardly through openings 65ª, 65ᵇ, and 65ᶜ aforementioned.

As indicated in Fig. 12, each of the securing bolts 50 has a rather loose fit within the alined openings in lower bolster 48 and plate 65, whereas each bolt 49 has a close or dowel fit within its associated alined openings in bolster 48 and plate 65.

As best illustrated in Fig. 10, the upper bolster 47 backs up the riveted ends of punch members 59 and 62, when plate 55 is secured to said bolster, thus insuring against any possible upward displacement of said punch members relatively to plate 55.

While we have in Figs. 6 to 12 shown punch press equipment adapted for operation upon a strip of insulating material 60, it is to be understood that metal punching equipment may be produced in a like manner. Moreover, it will be apparent to those skilled in the art that punch and die members adapted for use in punching and/or stamping metal parts may be attached to the soft metal backing plates in the manner herein disclosed.

What we claim as new and desire to secure by Letters Patent is:

1. The method of forming a die set, which comprises forming the punch and the die members without supporting flanges, then rivet welding the rear face of the punch member or the die member in a given relationship to the front face of a supporting flange forming plate, then rivet welding the rear face of the other member to the front face of a second supporting flange forming plate, while maintaining the working portion of said second member and said second plate in predetermined relationship to each other and to the working portion of said first member and said first plate respectively.

2. The method of producing a press tool comprising punch and die parts, which comprises forming the punch and die parts without supporting flanges, then rivet welding the rear face of one of said parts to the front face of a supporting flange forming plate, then placing the working edge only of the other of said parts in interfitting relationship with the working edge of said rivet welded part, placing the front face of a supporting flange forming plate against the rear face of said second mentioned part and in a predetermined position with respect to said supporting flange forming plate first mentioned, and then rivet welding together said second mentioned part and said supporting flange forming plate second mentioned, said supporting flange forming plates having drilled openings formed therein respectively to provide for such welding and said punch and die parts being free from such openings.

3. The method of producing a press tool comprising a punch and a die, which comprises forming the punch member and the die member of tool steel substantially without supporting flanges, placing a relatively soft steel plate in contact with the rear surface of one of said members in a relation to provide a supporting flange for the latter, said plate having a plurality of openings formed therein at points alined with portions of said member, rivet welding said plate at said openings to said rear surface of said member, while permitting a suitable degree of cooling of the parts between the welding operations, then placing the working portion only of the other member in interfitting relation to the working portion of said first member, then placing a second relatively soft steel plate in contact with the rear surface of said second member, while maintaining said plates in a predetermined relationship to each other, said second plate having a plurality of openings formed therein at points alined with portions of said second member, and then rivet welding said second plate to said rear surface of said second member at said openings, while permitting a suitable degree of cooling of the parts between the successive welding operations.

4. The method of producing a press tool comprising a punch and a die, which comprises forming the punch member and the die member of tool steel substantially without supporting flanges, placing a relatively soft steel plate in contact with the rear surface of one of said members in a relation to provide a supporting flange for the latter, said plate having a plurality of openings formed therein at points alined with portions of said member, rivet welding said plate to said rear surface of said member at said openings, while permitting a suitable degree of cooling of the parts between the welding operations, then placing the working portion only of the other member in interfitting relation to the working portion of said first member, then placing a second relatively soft steel plate in contact with the rear surface of said second member, while maintaining said plates in a predetermined relationship to each other, said second plate having a plurality of openings formed therein at points alined with portions of said second member, then rivet welding said second plate to said rear surface of said second member at said openings, while permitting a suitable degree of cooling of the parts between the successive welding operations, interposing said plates, with the punch and die members in interfitting relation, between a pair of press shoes which are retained in a predetermined alinement with each other, said press shoes having a predetermined arrangement of openings formed therein, and said plates having openings formed therein respectively alined with the openings in said shoes, to provide for insertion into the alined openings of fastening elements of suitable form.

5. The method of producing a press tool comprising a punch and a die, which comprises forming the punch member and the die member of tool steel without supporting flanges, placing a relatively soft steel plate in contact with the rear surface of one of said members in a relation to provide a supporting flange for the latter, said plate having a plurality of openings formed therein at points alined with portions of said member, rivet welding said plate to said rear surface of said member at said openings, while permitting a suitable degree of cooling of the parts between the successive welding operations, then placing the working portion only of the other member in interfitting relation to the working portion of said first member, then placing a second relatively soft steel plate in contact with the rear surface of said second member, while maintaining said plates in a predetermined relationship to each other, said second plate having a plurality of openings formed therein at points alined with portions of said second member, then rivet welding said second plate to said rear surface of said second member at said openings, while permitting a suitable degree of cooling of the parts between the successive welding operations, interposing said plates, with the punch and die members in interfitting relation, between a pair of press shoes which are retained in a predetermined alinement with each other, said press shoes having a predetermined arrangement of openings formed therein, and said plates having openings formed therein respectively alined with the openings in said shoes, to provide for insertion into the alined openings of fastening elements of suitable form, the aforementioned alined openings being so formed and/or arranged as to insure against attachment of said plates to their respective press shoes in more than one relationship to each other.

HARRY A. SEDGWICK.
ARTHUR JOHNSON.